Patented May 22, 1951

2,553,586

UNITED STATES PATENT OFFICE 2,553,586

PREPARATION OF METALLIC DERIVATIVES OF THE REACTION PRODUCTS OF PHOSPHORUS SULFIDE AND ESTERS OR AMINES BY THE USE OF METAL CYANAMIDES

Everett C. Hughes, Cleveland Heights, and John D. Bartleson, Cleveland, Ohio, assignors to The Standard Oil Company, Cleveland, Ohio, a corporation of Ohio No Drawing. Application July 11, 1946, Serial No. 682,919

12 Claims. (Cl. 252—32.7)

This invention relates to a method of preparing lubricants and lubricant additives suitable for use under various conditions, including high temperatures or high pressures, or both, as for example, use in an internal combustion engine operating at higher temperatures and in which the lubricant is in close contact with metallic surfaces, metal compounds and high temperature gases. Lubricating oils, particularly when used under such conditions, are subject to breakdown with lacquer deposition, sludge and acid formation, and tend to cause corrosion of the bearing and other metals with which they are in contact.

The reaction product of a phosphorus sulfide with an organic compound to form a lubricating oil additive has been proposed heretofore, and the conversion of such a reaction product to a corresponding metal derivative is also known. Such metal derivatives are usually formed by reaction with a base. The oxides or hydroxides of many metals are not sufficiently basic or otherwise reactive, so as to require superatmospheric pressure, reactants in specially prepared forms, or other undesirable reaction requirements.

The objects achieved in accordance with the present invention include the provision of an advantageous method of producing an agent which may be useful itself as a lubricant, and which agent when added to lubricants will markedly inhibit the very objectionable deposition of lacquer, and, at the same time, inhibit acid and sludge formation, corrosion and other types of deterioration occurring under operating conditions; and other objects which will be apparent as embodiments are set forth hereinafter.

In accordance with the invention, it has been found that metal containing derivatives of phosphorus sulfide-amine reaction products may be readily prepared from the metal cyanamide, especially those of group II metals, e. g. calcium cyanamide. In a preferred embodiment of the invention, the sulfide-organic compound reaction product is first reacted with a small amount of water, the excess water is removed, e. g. by blowing with nitrogen and then the reaction product is treated with the metal cyanamide.

The reaction of the metal cyanamide with the sulfide-organic compound reaction product, which may contain an added element of the sulfur family if desired, may be carried out at any reaction temperature such as in the range of 300° to about 700° F., desirably in the range of about 425° to about 575° F., and preferably at about 500° F. This reaction is also usually completed in four hours or less time, depending on the temperature, the reactivity of the components, rate of stirring, and other known factors. A diluent may be used as described hereinafter, but a diluent is not necessary. If a diluent is used in the sulfide-organic compound reaction step, it may be carried over into this reaction step, and may be separated subsequently if desired. From about 0.25 to about 6.0 equivalents of the metal cyanamide may be used per mol of the sulfide in the sulfide-amine reaction product, preferably about 2.0 to about 6.0 equivalents, in the case of calcium. An equivalent is the quotient of a mol divided by the valence of the metal concerned. The metal cyanamide is generally insoluble in the sulfide-amine reaction product, and the amount that reacts is the amount that is no longer present in the solid phase of the reaction product.

It is beneficial to treat the primary sulfide-organic compound reaction product with from about 5 to about 15% by weight thereof of water during or before treatment with the metal cyanamide. Treatment with the water may be carried out at a temperature in the range of from about 75° to about 250° F., preferably about 200° F., if the water treatment is a separate step before the reaction with the cyanamide. This treatment may be conducted for a period of from about a few minutes to about two hours. Thereafter, any excess or uncombined water may be removed by blowing with an inert gas, such as nitrogen, at a temperature of about 250° F. before treatment with the cyanamide. If desired the cyanamide may be added first and then water added to the mixture. It is believed that the reaction product obtained by reacting water with the primary sulfide-organic product reacts directly with the metal cyanamide to form the metal derivative.

After the reactants have all entered into solution, the reaction is complete. The reaction mass is then centrifuged or filtered to remove water and any traces of oil-insoluble by-product substances. If an excess of the metal cyanamide is used, the unreacted excess may be separated at this stage. If a volatile solvent was used as a diluent, it may be removed by vacuum distillation. The final products are usually clear oils or waxy solids at room temperatures, and clear, colored oils at temperatures above their melting points.

Generally, sulfide-organic compound reaction products, with or without an added element of the sulfur family, may be converted to the corresponding metal cyanamide reaction products, by treatment with one or more metal cyanamides which are reactive with water. The cyanamides may be of one or more of the following: an alkali metal, such as lithium, sodium, potassium, rubidium and caesium; an alkaline earth metal, such as calcium, barium, strontium, or magnesium, or lead or silver or copper. The metal should be selected with reference to the use of the composition and the properties desired in it. The alkali and alkaline earth metals have excellent detergent characteristics. The preferred metals are group I and group II metals of the periodic table. In the case of the derivatives of the group II metals which are not readily prepared in good yields by the usual methods, the invention provides an advantageous method of providing an ash forming calcium or the like containing constituent in a lubricating oil. An ash residue is called for in certain lubricating oil specifications, as known to the art.

A plurality of metals can be used such as sodium and calcium, calcium and barium, and the like. If the amount of the metal is small, the final product may be a mixture of the initial reaction product and the metal derivative.

In addition, mixed derivatives may be formed, e. g., a metal cyanamide derivative of a partially esterified sulfide-organic compound reaction product, or of a nitrogen base derivative of a sulfide-organic compound reaction product which has been partially converted and has been treated with a metal cyanamide.

The amount of the above-described metal cyanamide derivative of the sulfide-organic compound reaction product made in accordance with the invention that is to be added to an oil or grease will depend upon the characteristics of the oil or grease and the intended use. Some oils have more of a tendency to corrode metals, or to form acids, sludges and lacquer deposits than others, and such oils require larger amounts of the additive. In general, the range is from 1 to 10%, but under some circumstances, amounts as low as .01% show a significant improvement. As to an upper limit, of course, it may be uneconomical to add more than is necessary to impart to the lubricant the desired properties. Since the derivative is a lubricant, it may be used alone if desired.

The sulfide-organic compound reaction products which are converted to metal compounds with a cyanamide in accordance with the invention are not novel. They are prepared in accordance with many heretofore proposed processes. The sulfide and the organic compound are reacted in varying proportions as is well known at various elevated reaction temperatures, and separated from a sludge if one is formed. Elemental sulfur may then be reacted with the sulfide reaction product if desired.

The pentasulfide is preferred, though the sesquisulfide or any other sulfide or mixtures of sulfides may be employed. Phosphorus pentasulfide is economic and readily available and for this reason was used in the illustrative examples. Under suitable conditions, sulfides of arsenic or antimony may be similarly employed. The organic compound may be any which reacts with a phosphorus sulfide to form an oil-dispersible reaction product containing sulfur or sulfur and phosphorus. Generally the organic compound is of rather high molecular weight and preferably boils above the reaction temperature, i. e., above about 250° to 600° F. Those used commercially are generally of an aliphatic, alicyclic or aromatic nature. Examples are hydrocarbons such as lubricating oils, paraffins, naphthenes and olefins, olefin polymers, aromatics such as anthracene; amines such as primary and secondary amines saturated and unsaturated and unsaturated tertiary amines, ketones such as palmitone, higher aldehydes, aromatic compounds such as benzoic and naphthoic acids, phenols, such as diamyl phenol, alcohols such as lauryl alcohol, acids such as myristic, stearic and oleic acid, esters such as glyceride fats and oils, i. e., tallow and cocoanut oil, ester type waxes such as degras, beeswax, sperm oil and spermacetti, methyl stearate, cetyl butyrate, etc., oxidized petroleum products which are a mixture of acids, aldehydes, alcohols, etc., such as oxidized paraffin wax and naphthenic acid. Since these reaction products are known to the art as a general class they will not be described in more detail. Two will be selected merely as illustrative: the reaction of a phosphorus sulfide with (1) an amine and (2) hydrogenated sperm oil.

The primary sulfide-amine reaction product is a desirable starting material. It may be prepared by direct admixture of the reactants, or by their admixture in the presence of a diluent which may or may not be subsequently removed.

The primary sulfide-amine reaction may be carried out under a temperature within a wide range, a temperature in the range of about 100° to 400° F. being convenient and satisfactory. Higher temperatures up to about 600° F. or somewhat above may be used, and under such temperatures there is evolution of sulfur containing gas, for instance $H_2S$, and the resulting primary reaction product is more oil soluble than the lower temperature product.

The reaction time varies somewhat with the amine and the temperature and falls within the general range of from one minute to about 6 hours, desirably from about ¼ to about ¾ hours, and preferably about ½ hour. The reaction is usually complete in four hours or less time. The reaction time is a function of the temperature, the amount of the sulfide that is to react, the subdivision of the sulfide, rate of stirring, etc. The reaction is somewhat exothermic and on a commercial scale the heat evolved thereby may be used to maintain the temperature.

To achieve an additional improvement which results if additional reacted sulfur is present in the additive, about 0.0 to 2.0, and preferably 0.1 to 0.7, gram atoms of sulfur per gram mol of the amine is desirable. This sulfur can be incorporated by adding elemental sulfur, preferably after the formation and cooling of the high temperature primary reaction product, and maintaining the mass at about 200° to 300° F. for about a few minutes to several hours, and preferably about one hour. Selenium and tellurium, the other members of the sulfur family, function in much the same way as sulfur in this respect, and may be incorporated similarly. The sulfur can also be added to the metal derivatives.

The reactions may be carried out in the presence or absence of air or in an atmosphere of non-deleterious gas, such as nitrogen or $H_2S$.

The amine or amines may be reacted with the phosphorus sulfide or sulfides in mol ratios of one mol of amine to from 0.01 to about 1.1 mols of sulfide. Even small amounts show a significant improvement. Generally, about 0.25 to 1.0 mol is the usual range that will be used.

A very large variety of amines are suitable, for example, either aliphatic, aromatic or heterocyclic primary or secondary amines or derivative primary or secondary amines thereof; all of these contain at least one amine hydrogen, which is a hydrogen attached directly to the nitrogen. The choice may be controlled by the desired lubricant solubility characteristics of the primary sulfide-amine or the final base derivative product. Primary and secondary aliphatic amines which have an aliphatic radical of at least twelve carbon atoms are preferred, and of these the mono- or di- octadecyl or hexadecyl amines or mixtures containing at least one of them are given as illustrative. Unsaturated tertiary amines are especially suitable; e. g., those containing an aliphatic radical of at least 10 carbon atoms, the other two substituents being aliphatic radicals of one to five carbon atoms. Octadecenyl-dimethylamine is typical. Analogous polyamines may be used. Commercial dioctadecylamine is a commercially available amine and for this reason is used in the illustrative example.

The amine stock may be a mixture of different amines of different molecular weight and degrees of substitution and containing unsaturated or saturated radicals. Lower primary, secondary, or tertiary amines containing less than twelve carbon atoms may be present.

The yield is very high and appreciable amounts of oil insoluble products are not formed. Generally, the amount of sulfide is chosen so that it will all react at the temperature selected, and the reaction is continued until it is consumed.

The other type reaction product chosen as illustrative is a sulfide-organic oxygen containing compound such as an acid, alcohol or ester of aliphatic, aromatic or naphthenic in nature. The same general considerations apply as described heretofore. At lower temperatures, varying somewhat with the organic oxygen containing compound, a thiophosphate is formed. When this product is desired the proportions are stoichiometric for the particular wanted thiophosphate. At higher temperatures of 270° to 400° F., depending somewhat on the organic oxygen containing compound a major portion of the oxygen is removed from the compound to form a reaction product high in sulfur and lower in phosphorus which is separable from an oxygen containing sludge. The proportions preferably are such that the oxygen can be replaced by sulfur from the sulfide. This reaction product as well as the thiophosphate can be reacted with added elemental sulfur.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

Example 1

(a) 800 grams of commercial dioctadecylamine (a mixture of about three parts by weight of dioctadecylamine and one part of trioctadecylamine), 281 grams of phosphorus pentasulfide, 5 ml. of commercial silicone solution, 1200 grams of No. 225 Red Oil (a conventional acid treated Mid-Continent lubricating oil base stock of S. A. E. 20) and 1200 grams of No. 300 Red Oil (a conventional acid treated Mid-Continent lubricating oil base stock S. A. E. 30 or slightly lower) were mixed and heated to 500° F. and maintained at this temperature for 30 minutes. A considerable amount of gas which largely consisted of $H_2S$ was evolved. 16 grams of sulfur was added to the reaction mass and the reaction mass maintained at 300° F. for one hour, then the product was filtered hot.

(b) 500 grams of the above sulfide-amine reaction (a) was mixed with 33 cc. of water and the mixture heated at about 200° F. on a steam bath for two hours, with agitation. It was then blown with nitrogen for one and one-half hours at 250° F. to dry the product.

(c) 200 grams of the above water treated product (b) and 14.6 grams of calcium cyanamide were mixed and the mixture heated for one hour at 500° F. with agitation. The reaction product was filtered hot. 144 grams of product was obtained as a filtrate. It analyzed 3.42 weight per cent ash.

Example 2

(a) Hydrogenated sperm oil is reacted with 20% phosphorus sulfide at a temperature of about 300° F. This hydrogenated sperm oil is available under the trade-name of "Spermofol No. 52." It has an iodine value of 6–7, a melting point of 50–52° C., a free fatty acid content (as oleic) of 1.0–2.0%, a saponification value of 135–138, and about 36% of unsaponifiables. After the reaction is complete, which under the reaction conditions takes 4 hours, the material is permitted to stand, after which the by-product residue settles and the reaction product is decanted; following this, it is filtered with the use of a filter aid. The yield of the reaction product based upon hydrogenated sperm oil raw material is 100%.

(b) 360 grams of the above sulfide-spermafol reaction product (a) was mixed with 40 grams of water and the mixture heated at about 200° F. on a steam bath for one and one-quarter hours, with agitation. It was then blown with nitrogen for three hours at 250° F.

(c) A quantity of this reaction product 2 (b) was mixed with 15 weight per cent thereof of calcium cyanamide and the mixture heated for four hours at 500° F., with agitation. The reaction product was filtered hot. A 40 weight per cent yield of product was obtained as a filtrate. It analysed 0.4 weight per cent ash.

In order to demonstrate the properties of the metal cyanamide derivatives of the phosphorus sulfide-organic compound reaction products in improving the characteristics of lubricating oils, representative additives were incorporated into conventional lubricating oils. The lubricating oils containing these additives were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September 1941, and in another paper by the same authors presented at the New York city meeting of the American Chemical Society in September, 1944, published in Industrial and Engineering Chemistry, analytical edition, vol. 17, No. 5, May 1945, pages 302–309. The latter paper also correlates the results of such laboratory tests with the so-called standardized "Chevrolet engine test."

Essentially the laboratory test equipment consists of a vertical thermostatically heated, large glass test tube, into which is placed a piece of steel tubing of about one-third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "standard" test the temperature used is approximately the average temperature of the crankcase. The rate of air flow per volume of oil is adjusted to the same as the average for a test engine in operation. Of the catalytic effects, those due to iron are the most important. They are empirically duplicated by the addition of a soluble iron salt. Those due to lead-bromide are duplicated by its addition. In the "standard" test, 0.012% of iron salt is added; and in the "iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following tables were obtained from tests using:

a 160 cubic centimeter sample of the lubricant composition
70 liters of air per hour
100 square centimeters of steel surface
4.4 square centimeters of copper-lead surface
1.0 square centimeters of copper surface
0.01% by weight of lead bromide powder
0.05% soluble iron calculated as $Fe_2O_3$ (ferric 2-ethyl hexoate in C. P. benzene)

The "iron tolerance" tests were run at 280° F. for thirty-six hours. The lacquer is deposited on the steel tube and is determined by difference in weight of the tube after washing with chloroform and drying to constant weight. The used oil was sufficient to enable the determination of all of the usual oil tests, viz. isopentane insolubles, viscosity, acid number, etc.

The data in the following table shows the results obtained in testing our new additives by the tests described.

"Iron tolerance" tests on a conventional Mid-Continent solvent extracted lubricating oil base stock (S. A. E. 30) and compositions containing this oil and a metal cyanamide derivative of phosphorus pentasulfide-organic compound reaction products of the invention were run for the above-described additives. The results given in the following table are representative.

| Additive From Example No | None | 1(c) | 2(c) |
|---|---|---|---|
| Concentration of Additive in per cent by weight | None | 1 | 4 |
| Lacquer Deposit (in milligrams) | 1.2 | 0.4 | 0.1 |
| Sludge (isopentane insoluble in milligrams) | 206.4 | 2.7 | 3.0 |
| Acid Number | 14.5 | 1.73 | 1.7 |
| Viscosity Increase (SUS) | 1,095 | 208 | 105 |

These data show the marked improvement imparted to the lubricating oil by the calcium cyanamide derivative of the invention. The very marked reduction of sludge is particularly noteworthy, especially when one considers the small amount of the Example 1 (c) additive (1%) used. Every indicated characteristic is improved by these calcium cyanamide derivatives of the invention.

The metal cyanamide derivatives prepared in accordance with the invention contain a metal or ash forming constituent. It is believed that the cyanamide group also reacts and influences the final reaction product.

In order to prevent foaming of the oil containing a small proportion of the additive, it is desirable in some cases to add a very small amount of tetra-amyl silicate, or an alkyl ortho carbonate, ortho formate or ortho acetate. 0.0003% of polyalkylsilicone oil, or 0.001% of tetra-amyl silicate was found to prevent foaming upon bubbling of air through oil containing a few per cent of the additive.

It will be obvious to one skilled in the art that metal cyanamide derivatives of sulfideamine reaction products and similar products obtained by introducing phosphorus and/or sulfur into an amine as prepared according to different procedures but having substantially the same properties as those herein described, may be made up into lubricant composition in according with the invention. The invention as claimed contemplates such compositions broadly, except as do not come within the following claims.

We claim:

1. In the process of preparing calcium-containing derivatives of oil-dispersible reaction products of a phosphorus sulfide and an organic compound reactive with phosphorus sulfide and selected from the group consisting of amines and esters reactive with phosphorus sulfide, the improvement which comprises reacting said reaction product with 0.25 to 6.0 equivalents of calcium cyanamide per mol of the phosphorus sulfide in said reaction product at a temperature in the range of 300 to 700° F. to provide an oil-dispersible ash-forming calcium-containing final reaction product for use as a lubricant and as an additive for lubricants to improve their characteristics.

2. A method in accordance with claim 1 in which the phosphorus sulfide is phosphorus pentasulfide.

3. A method in accordance with claim 1 in which the organic compound is an ester type wax having at least one aliphatic radical of at least 12 carbon atoms.

4. A method in accordance with claim 1 in which the organic compound is an ester having at least one aliphatic radical and at least 12 carbon atoms.

5. A method in accordance with claim 1 which includes incorporating 0.01% to 10% of the final reaction product in a mineral lubricating oil to inhibit the deterioration thereof.

6. In the process of preparing calcium-containing derivatives of oil-dispersible reaction products of a phosphorus sulfide and an organic compound reactive with phosphorus sulfide and selected from the group consisting of amines and esters reactive with phosphorus sulfide, the improvement which comprises reacting said reaction product with 5 to 15% by weight thereof of water at a temperature in the range of 75 to 250° F., separating unreacted water therefrom and then reacting the resulting product with from 0.25 to 6.0 equivalents of calcium cyanamide per mol of phosphorus sulfide in said reaction product at a temperature in the range of 300 to 700° F. to provide an oil-dispersible ash-forming calcium-containing final reaction product for use as a lubricant and as an additive for lubricants to improve their characteristics.

7. In the process of preparing calcium-containing derivatives of oil-dispersible reaction products of a phosphorus sulfide and an organic compound reactive with phosphorus sulfide and selected from the group consisting of amines and esters reactive with phosphorus sulfide, the improvement which comprises reacting said reaction product with water and 0.25 to 6.0 equivalents of calcium cyanamide per mol of phosphorus sulfide in said reaction product under conditions of pressure and temperature in the range of 300 to 700° F. to favor prompt elimination of excess unreacted water from the reaction system whereby the reaction of calcium cyanamide with said reaction product proceeds largely in the absence of water to provide an oil-dispersible ash-forming calcium-containing final reaction product for use as a lubricant and as an additive for lubricants to improve their characteristics.

8. In the process of preparing calcium-containing derivatives of oil-dispersible reaction products of phosphorus sulfide and an organic amine reactive with phosphorus sulfide, the improvement which comprises reacting said reaction product with 0.25 to 6.0 equivalents of calcium cyanamide per mol of the phosphorus sulfide in said reaction product at a temperature in the range of 300 to 700° F. to provide an oil-dispersible ash-forming calcium-containing final reaction product for use as a lubricant and as an additive for lubricants to improve their characteristics.

9. A method in accordance with claim 8 in which the reaction product of phosphorus sulfide and organic amine contains added reacted sulfur.

10. A method in accordance with claim 8 which includes incorporating 0.01% to 10% of the final reaction product in a mineral lubricating oil to inhibit the deterioration thereof.

11. In the process of preparing calcium-containing derivatives of oil-dispersible reaction products of phosphorus sulfide and an organic amine reactive with phosphorus sulfide, the improvement which comprises reacting said reaction product with from 5 to 15% by weight thereof of water at a temperature in the range of 75 to 250° F., separating unreacted water therefrom and then reacting the resulting product with from 0.25 to 6.0 equivalents of calcium cyanamide per mol of phosphorus sulfide in said reaction product at a temperature in the range of 300 to 700° to provide an oil-dispersible ash-forming calcium-containing final reaction product for use as a lubricant and as an additive for lubricants to improve their characteristics.

12. In the process of preparing calcium-containing derivatives of oil-dispersible reaction products of phosphorus sulfide and an organic amine reactive with phosphorus sulfide, the improvement which comprises reacting said reaction product with water and 0.25 to 6.0 equivalents of calcium cyanamide per mol of phosphorus sulfide in said reaction product under conditions of pressure and temperature in the range of 300 to 700° F. to favor prompt elimination of excess unreacted water from the reaction system whereby the reaction of calcium cyanamide with said reaction product proceeds largely in the absence of water to provide an oil-dispersible ash-forming calcium-containing final reaction product for use as a lubricant and as an additive for lubricants to improve their characteristics.

EVERETT C. HUGHES.
JOHN D. BARTLESON.

REFERENCES CITED

The following references are of record in the file of this patent:

UNITED STATES PATENTS

| Number | Name | Date |
|---|---|---|
| 2,242,260 | Prutton | May 20, 1941 |
| 2,316,085 | Kelso | Apr. 6, 1943 |
| 2,331,923 | Musselman | Oct. 19, 1943 |
| 2,403,474 | Bartleson | July 9, 1946 |
| 2,403,894 | Bartleson | July 9, 1946 |
| 2,419,153 | Musselman | Apr. 15, 1947 |